US005990450A

United States Patent [19]

Kirker et al.

[11] Patent Number: 5,990,450

[45] Date of Patent: Nov. 23, 1999

[54] ROTARY CONVEYOR

[75] Inventors: Eric John Kirker, Vandalia; William R. Patterson, Jr., Miamisburg; Donald Ray Hall; David L. Hall, both of Clayton, all of Ohio

[73] Assignee: Odawara Automation, Inc., Tipp, Ohio

[21] Appl. No.: 08/964,704

[22] Filed: Nov. 5, 1997

Related U.S. Application Data

[60] Provisional application No. 60/030,634, Nov. 8, 1996.

[51] Int. Cl.[6] .......................... B65G 47/252; F27B 9/16; F27B 9/36; F27D 3/12

[52] U.S. Cl. .......................... 219/388; 432/124; 432/125; 198/377.01; 198/377.07; 118/642

[58] Field of Search ............................ 219/388; 432/121, 432/122, 124, 125; 198/377.01, 377.07, 614, 615, 435; 414/937; 99/339, 340, 421 P, 443 C; 118/322, 641, 642, 668, 730

[56] References Cited

U.S. PATENT DOCUMENTS

| | | | |
|---|---|---|---|
| 2,517,360 | 8/1950 | Singer | 99/421 P |
| 2,549,019 | 4/1951 | Saunders | 99/421 P |
| 2,574,686 | 11/1951 | Brown | 118/642 |
| 3,309,982 | 3/1967 | Surks | 198/377.01 |
| 3,390,757 | 7/1968 | Edwards et al. | 198/377.01 |
| 3,552,299 | 1/1971 | Patoks | 99/339 |
| 3,732,066 | 5/1973 | Kipple et al. | 432/49 |
| 3,744,403 | 7/1973 | Castronuovo | 99/421 P |
| 3,782,892 | 1/1974 | Johnson et al. | 432/132 |
| 4,050,889 | 9/1977 | Kohn | 432/130 |
| 4,116,325 | 9/1978 | McDonald | 198/377 |
| 4,305,329 | 12/1981 | Fenoglio | 99/339 |
| 4,967,487 | 11/1990 | Urquhart | 118/642 |
| 4,969,414 | 11/1990 | Bair et al. | 118/668 |
| 5,254,164 | 10/1993 | Masahumi | 118/642 |
| 5,275,521 | 1/1994 | Wada | 414/937 |
| 5,338,189 | 8/1994 | Hata et al. | 432/124 |
| 5,743,965 | 4/1998 | Nishimura et al. | 118/641 |

*Primary Examiner*—Joseph Pelham
*Attorney, Agent, or Firm*—Thompson Hine & Flory LLP

[57] ABSTRACT

A rotary conveyor comprising an annular array of a plurality of circumferentially spaced work piece support members for receiving a corresponding plurality of work pieces. They conveyor further include a first drive ring coaxially associated with the array for rotating the work pieces in the work piece support members. The drive ring is rotatable with respect to the array such that relative movement between the drive ring and the array causes the work pieces to rotate. The invention further includes a rotary oven for depositing and curing resin on work pieces having a shaft thereon. The oven comprises an annular array having a plurality of circumferentially spaced work piece support members. Each work piece support member has a sprocket mounted on its radially inward end and is shaped so as to receive a work piece in its radially outward end. The oven further comprises a drive ring coaxial with the array, the drive ring having a chain mounted about its outer periphery such that the work piece support member sprockets mesh with the chain. The oven also includes a plurality of heating elements to heat the work pieces retained in the work piece support members, and a motor coupled to the ring for rotating the ring about the ring axis. The oven further comprises indexing means coupled to the array for step-wise rotating the annular array, whereby as the array is indexed the work pieces are passed under the heating elements to thereby heat and cure the work pieces.

34 Claims, 16 Drawing Sheets

ROTARY CONVEYOR

This application claims the benefit of U.S. Provisional Application Ser. No. 60/030,634. The invention relates to a rotary conveyor and particularly to a rotary conveyor useful in a rotary oven for applying and curing resin on work pieces such as armatures or stators for electric motors.

BACKGROUND OF THE INVENTION

It is a well known practice in the electric motor manufacturing industry to coat and impregnate work pieces, such as armatures and stators, with a resin. Traditionally, this process has been implemented through the use of long, conveyor-driver ovens in which a plurality of work piece fixtures are mounted onto parallel chains. The work pieces are loaded onto a work piece fixture and are transported, in an indexed fashion, through the phases of preheat, trickle, gel and cure. These processes are completed while the work piece is continuously rotated by the work piece fixtures. The work piece fixtures are rotated by a separate system of rotation chains that engage sprockets on the work piece fixtures.

There are numerous problems associated with the above-described linear coating and curing process. The machines required to carry out this process are very long, ranging from twelve to thirty feet or more, and require large amounts of floor space. Additionally, there are several stations along the conveyer line where it is desirable to precisely locate the position of the armatures or stators because precise operations must be carried out. For example, the load/unload point, and the four to six stations where the resin is applied to the work piece, must be accurately located. On a conventional chain-driven machine, it is possible to roughly locate only a single work piece at the load/unload point, and the resin application stations remain essentially unlocated. The chain that conveys the work piece fixtures is simply not precise enough to produce predictable or repeatable work piece locations. Aggravating this situation is the fact that as the drive chains heat up during a normal production day, the fixture locations change as the chains expand and stretch from wear and lack of lubrication.

In many cases it is desirable to have the armatures or stators rotate at different speeds at different stages of the process. In current machines a multitude of chain driven rotation drives are utilized. As the work piece indexes from one drive chain to the next, the fixture sprockets are forced to find their own mesh with the rotation chains. As a result, it is quite common to hear loud crashes within the oven as a sprocket tooth collides with the roller on a rotation chain. This collision causes damage to both the drive sprockets and the rotation chains, and also places strain on the fixture carrying chains and the fixture bearings. It is also desirable to avoid the creation of areas between the separate sections of the drive chains where the work pieces do not rotate, which can causes uneven balance of the resin on the work piece.

Accordingly, there exists a need for an oven for applying and carrying resin which is compact, is able to precisely locate the work pieces, can rotate the work pieces at different speeds, and is easy to service and maintain.

SUMMARY OF THE INVENTION

The present invention provides a rotary conveyor which is designed to rotate work pieces as they are conveyed about a circular path. The conveyor comprises an annular array of a plurality of circumferentially spaced work piece support members for receiving work pieces; a first drive ring coaxially associated with said array for rotating said work pieces in said work piece support members; said drive ring being movable relative to said array such that relative movement between said drive ring and said array rotates said work pieces. The term array is used broadly herein to define a plurality of circumferentially arranged work piece support members located in a common plane at a single elevation. A plurality of arrays may be utilized, with each array being located at a different elevation. In one embodiment, each array is carried in a generally cylindrical frame comprising a plurality of vertical support members arranged in a circle. In an alternate embodiment, each array is carried on a corresponding annular platform. The structures supporting the annular arrays are rotated to carry the work pieces to locations where they are coated with the resin and heated by the heating elements to cure the resin.

In a preferred embodiment of the invention, the conveyor is part of a rotary oven which is useful in coating work pieces, such as armatures and stators, with an insulating resin. The oven comprises a plurality of axially spaced annular arrays, each array comprising a plurality of circumferentially spaced work piece support members, a plurality of heating elements is provided above the arrays and spaced about the periphery of the arrays, and a resin supply is provided for applying resin to the surface of the work pieces as they are carried in the support members. The invention also provides a method for coating parts with a resin using the oven described herein.

In accordance with one particular embodiment of the invention, the work piece support members are carried on annular platforms which are mounted on the outer race of a turret bearing. Teeth provided on the outer surface of the outer race are rotationally driven by a pinion which in turn rotates the annular platforms.

In a still more particular embodiment of the invention, the work piece support members are rotated as they are transported about the oven. For example, the work piece support members may include a collet assembly which is carried on a shaft. The shaft is rotated by a drive member which is in turn mounted on the inner race of the turret bearing. The turret bearing is driven independently of the outer race by a separate pinion drive to produce relative movement between the drive member and the work piece support members which in turn causes the collet to rotate.

One more particular embodiment of the present invention is a rotary oven for depositing and curing resin on work pieces having a shaft thereon. The oven comprises a lower annular array having a plurality of generally circumferentially spaced work piece support members including assemblies such as collet assemblies for rotating the work pieces on a spindle. Each work piece support member has a sprocket mounted on its radially inward end and is adapted to receive a work piece in its radially outward end. The oven further comprises a drive ring coaxial with the array, the drive ring having a side-flexing chain mounted about its periphery such that the work piece support member sprockets mesh with the chain. The oven additionally includes a plurality of heating elements located above the periphery of the array such that the heating elements heat the work pieces retained in the collet assemblies, and a motor coupled to the drive ring for rotating the drive ring about the ring axis, whereby when the drive ring is rotated, the sprockets, collet assemblies and work pieces all rotate about their axes. The oven further comprises an indexing drive means coupled to the array for step-wise rotating the annular array, whereby as the array is indexed the work pieces are passed under the heating elements to thereby heat the work pieces. In accordance with one particular embodiment of the invention, the work piece support members are carried within a cylindrical frame which is mounted on the outer race of a turret bearing. Teeth are provided on the outer surface of the race of the turret bearing such that the outer race can be rotationally driven by a pinion which in turn rotates the cylindrical frame. Using the conveyor of the invention, the work piece support members can be located in a far more precise manner than has been achieved with the chain conveyers used in conventional linear ovens. This allows for precise work piece location anywhere within the machine, and particularly at the load, unload and resin application stations.

The invention further includes method for depositing and curing resin on work pieces having a shaft thereon. The method comprises the steps of providing a rotary oven having a first annular array comprising a plurality of generally circularly arranged, radially spaced work piece support members. Each work piece support member has a sprocket mounted radially inwardly and is adapted to receive a work piece. The oven further comprises a first drive ring coaxial with the first array, the ring having a chain mounted about its periphery such that the sprockets mesh with the chain, and a plurality of heating elements located above the periphery of the first array such that the heating elements heat the work pieces. The method further comprises the step of loading the work pieces in the work piece support members and rotating the first drive ring about the ring axis, whereby when the first ring is rotated, the sprockets, the work piece support members and the work pieces rotate about their axes. The method further includes the step of indexing the annular array, whereby as the array is indexed the work pieces are passed under the heating elements thereby heating and curing the work pieces.

The present invention provides for interchangeable heating elements which are easily accessed through outwardly pivoting arcuate doors located about the perimeter of the oven. These doors also provide for easy maintenance of the work piece support members. The doors also provide access for unloading work pieces in the event of an interruption in manufacturing operations. In a particular embodiment of the invention, the arcuate door is the outside wall of a heating chamber and the entire chamber including the heating element pivots outwardly with the doors to provide for maintenance, cleaning and access to the heating elements, the work pieces and their support members.

Other objects and advantages of the present invention will become apparent from the following description, the accompanying drawing and the appended claims.

DETAILED DESCRIPTION

Figure 1:
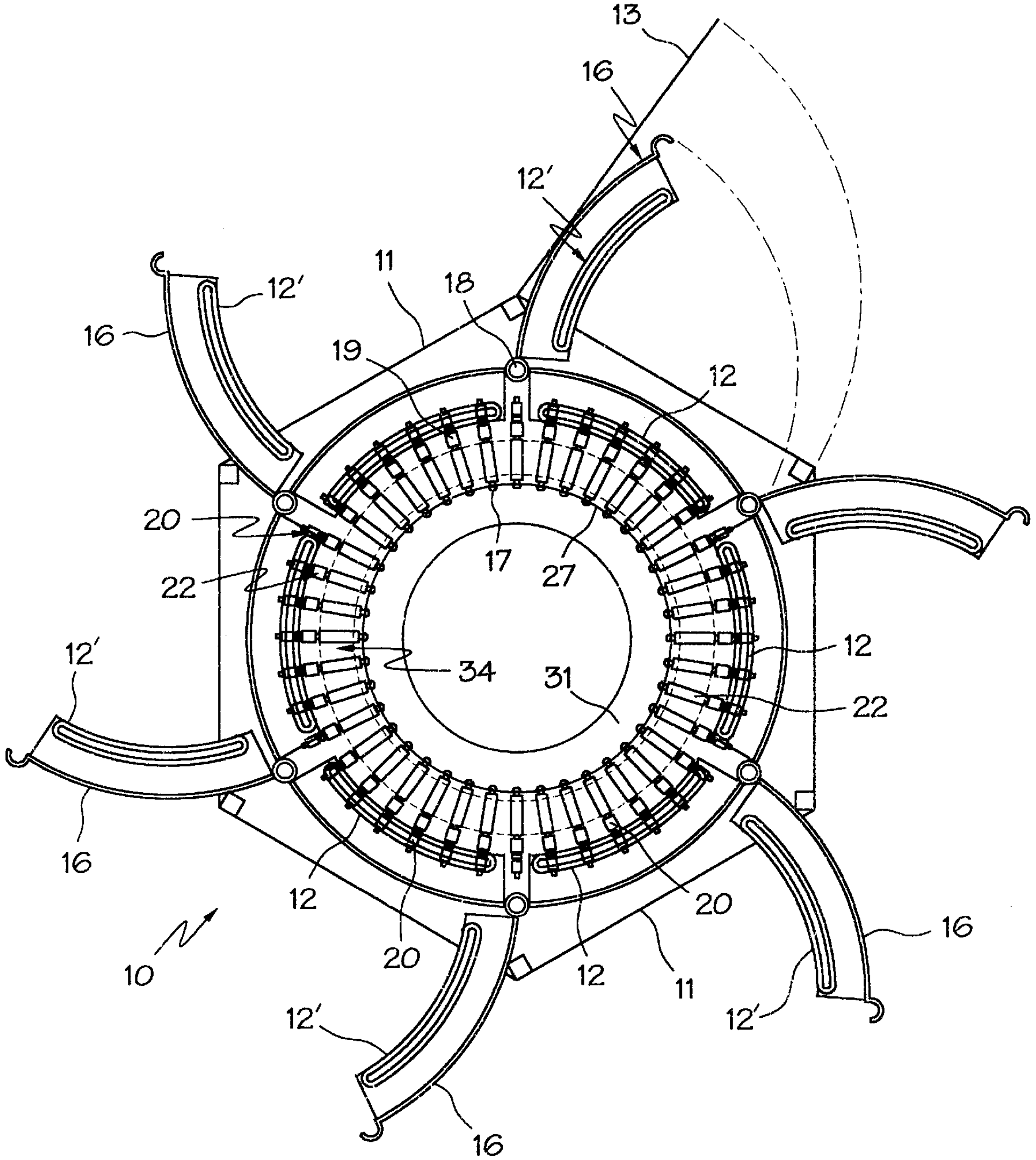
FIG. 1 is a top plan view of a top array of a rotary oven in accordance with the present invention.
Figure 2:
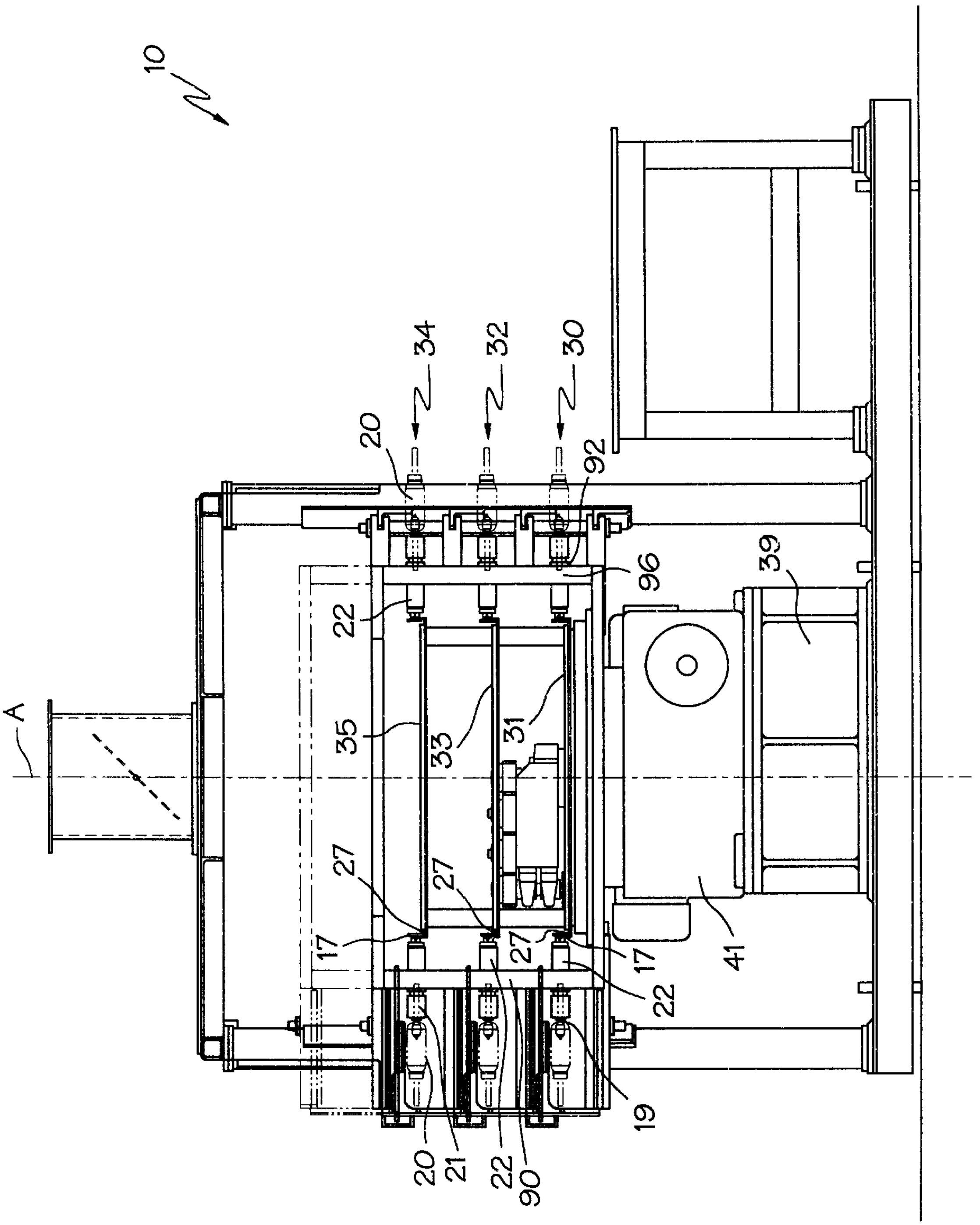
FIG. 2 is a side cross-sectional view of the oven of the present invention.

As shown in FIGS. 1–2, the rotary oven, generally designated 10, includes a plurality of axially spaced, vertically stacked arrays. FIG. 1 shows a top plan view of the top array 34 of the oven 10. A hexagonal outer housing 11 encompasses the oven and several access doors 13 are provided about the periphery of the outer housing. As shown in FIG. 2, a preferred embodiment of the oven utilizes three arrays: the lower array 30, middle array 32, and upper array 34. Each array 30, 32, 34 includes a series of radially spaced work piece support members 22 arranged in a generally circular manner. Each work piece support member 22 has a sprocket 17 on its radially inward end and a split bushing 19 on its radially outward end. The split bushing 19 is of a size so as to receive a shaft 21 of a work piece 20.

In a preferred embodiment, the work piece support members 22 are collet assemblies. The invention is illustrated herein using collet assemblies as a type of work piece support member. However, depending upon the application for which the oven is used any type of work piece support member which permits rotation of the work pieces, including, for example, a pair of opposed V-blocks, may be used to receive the work piece. Additionally, the invention is illustrated and generally described herein using armatures a work pieces. However, it is within the scope of the present invention to accommodate other work pieces, such as stators. When treating stators with the oven of the present invention, other means of coupling the work piece to the work piece support member are used. For example, a shaft may be loaded into the split bushing 19 and coupled to the stator.

With continued reference to FIG. 2, the oven further includes a lower annular ring 31, middle annular ring 33, and upper annular ring 35. Each ring 31, 33, 35 has a side-flexing chain 27 on its outer periphery which meshes with the sprockets 17 of the collet assemblies 22. The rings 31, 33, 35 are rotationally driven by collet rotational drive system 39. Thus, as the rings 31, 33, 35 are rotationally driven, the sprocket 17 of the collet assemblies 22 are rotated. The rotation of the work piece support member 22 causes, in turn, rotation of the work pieces 20. This rotation allows for an even heating and curing of the work pieces, as well as even application of the resin. An advantage provided by this arrangement is that the side-flexing chain 27 does not require lubrication.

While the invention is described as using sprocket which meshes with a chain to rotate the work pieces in the work piece support member, it is to be understood that various means of causing work piece rotation may be used. For example, the use of rollers which are rotated by frictional forces, in place of the sprockets and chain, may be used. Additionally, beveled rollers or beveled gears on the work piece support members which engage correspondingly beveled surfaces on the rings may be used.

Figure 3:
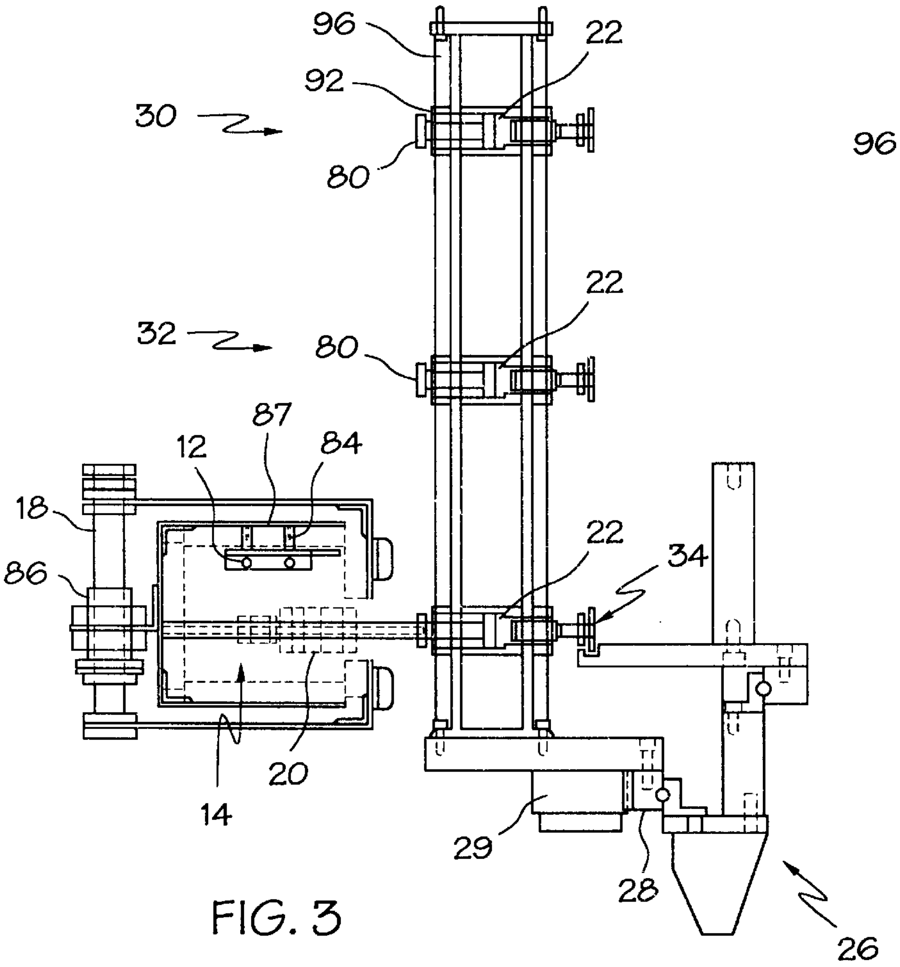
FIG. 3 is cross-sectional view of selected components of the oven of FIG. 2.

The arrays 30, 32, 34 are supported on the outer race 28 of the turret bearing 26 (FIG. 3). Turret bearings useful in the invention are commercially available from Rotek and Kaydon. The outer race 28 is indexed by a pinion 29 that meshes with the teeth of outer race 28. The pinion 29 is driven by an electric motor drive (not shown). In this manner, the pinion rotates the outer race 28, and in turn indexes the lower array 30, the middle array 32 and the upper array 34. This indexing causes the work pieces contained in the collet assemblies 22 to travel in a circular path about the oven central axis A (FIG. 2). In an alternate embodiment, the electric motor drive is replaced by a commercially available indexer 41 (FIG. 2).

As described above, the rings 31, 33, and 35 are rotatably driven by the drive system 39 which operates independently of the mechanism that indexes the arrays. Additionally, each of the rings may be driven independently of each other. Thus if desired it is possible to change the speed of rotation of the rings 31, 33, 35 during the short period of time that the annular arrays 30, 32, 34 are indexed in order to maintain a constant speed of work piece rotation. In existing ovens, it is not unusual for the rotation of the work pieces to speed up or slow down when the main index chains move the collets 22 with respect to work piece rotation drive chains. This can cause uncured resin to either be slung from the work piece as it rotates, or to sag to one side of the work piece.

One example of a method for coating work pieces with resin is as follows. The work pieces are first loaded onto the work piece support members in the first array, travel nearly a complete rotation, are moved to a second array, again travel nearly a complete rotation, and finally are moved to a final array where curing is completed. After completing a nearly complete rotation on the final array, the work pieces 20 are removed from the oven 10. In the embodiment illustrated herein, the first array is the lower array 30. The work pieces are then elevated to the middle array 32 (the second array) and finally to the upper array 34 (the final array). However, it is to be understood that other order of operations may be used in treating and curing the work pieces using the oven of the present invention. The arrays 30, 32, 34 may be rigidly coupled so that they rotate together. Alternatively, the arrays may be coupled independently by a gearing, which allows the arrays to index in different directions. All the indexing occurs while the work pieces 20 are continually rotated about their individual axes. In the manual loading configuration, indexing the final array in the opposite direction from the previous arrays provides work pieces to the operator on the same side of the transfer mechanism that the operator is on.

FIG. 1 shows a top plan view of the lower array 30. A plurality of heating elements 12 are circumferentially spaced to make up the array. The heating elements 12 are used to preheat the work pieces before resin is applied to the work pieces, or to cure the resin after it is applied. The heating elements are preferably mounted on doors 16 that swing outwardly on posts 18 provided in the oven frame. The heating elements 12 are shown in FIG. 1 in their "open" position as heating elements 12'.

Figure 8:
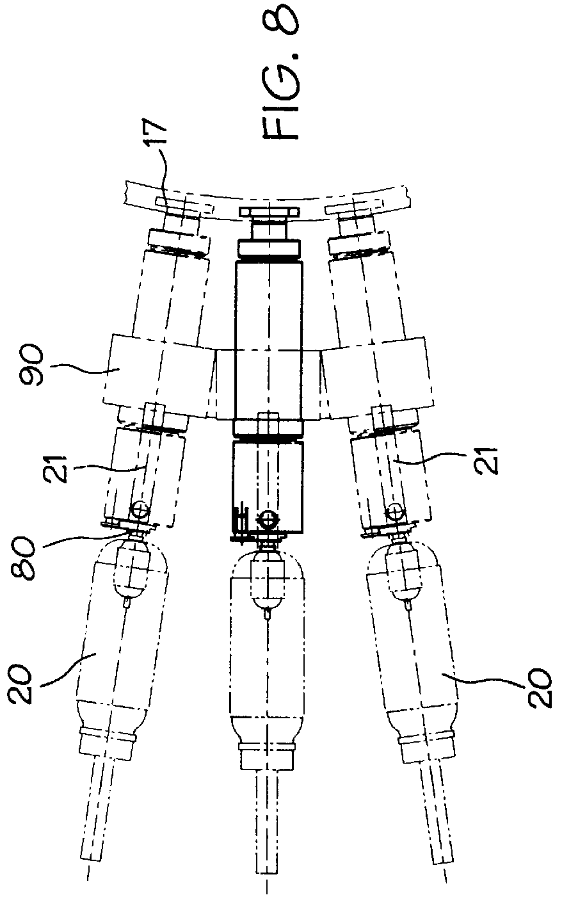
FIG. 8 is a top plan view of the collets and work pieces of FIG. 6.
Figure 6:
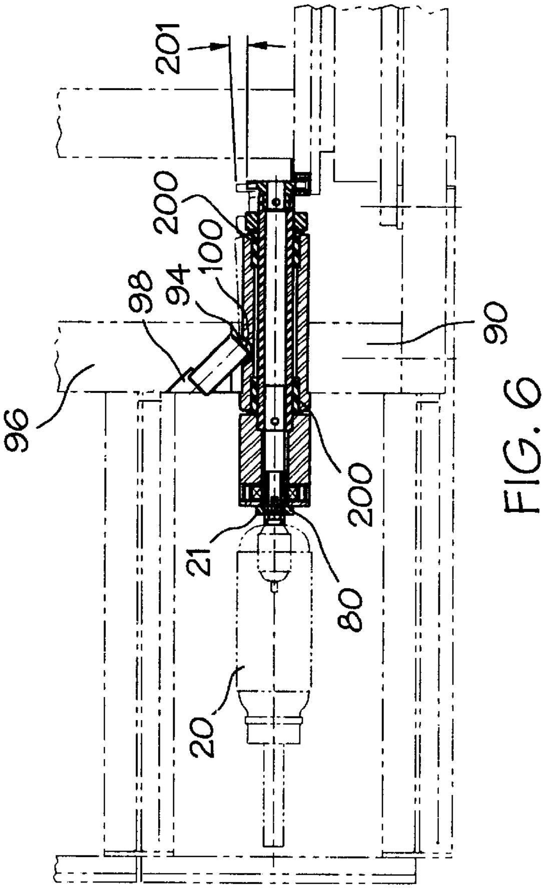
FIG. 6 is a side view of the collets of the present invention shown with an associated work piece.
Figure 7:
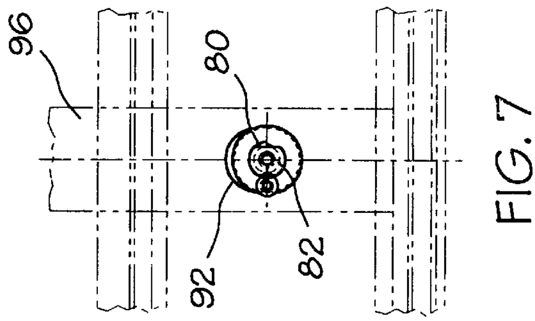
FIG. 7 is an end view of the collets and work pieces of FIG. 6.

Each work piece support member 22 is designed to receive and retain a work piece therein. A preferred work piece support member 22, shown in FIGS. 6–8, is designed to receive the shaft 21 of a work piece 20. The collet assembly 22 may include a conventional collet or it may employ a split, spring-loaded bushing 80. The spring-loaded bushing 80 has a central hole 82 (FIG. 7) which is smaller in diameter than the shaft 21 of the work pieces 20. The bushing 80 comprises two opposed halves of the bushing and each of the two halves is spring biased radially inwardly (radially inward with respect to the collet assembly). Thus, once the shaft 21 is forced into the bushing 80, it is gripped and retained by the spring force on each half of the bushing 80. The shaft 21 may be removed from the collet 22 upon application of sufficient force in the radially outward direction (radially outward with respect to the oven). Such force may be applied manually or by an unloading mechanism. The collet 22 is preferably designed such that it requires no lubrication, but instead uses a graphalloy bushing 200. The graphalloy bushings 200 requires no lubrication and function well at elevated temperatures. They are preferred over the use of ball bearings.

Figure 4:
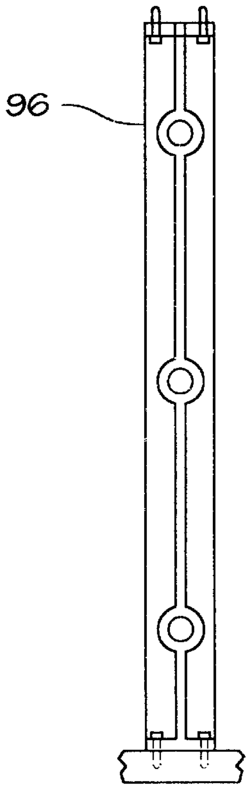
FIG. 4 is an end view of a vertical support member.
Figure 5:
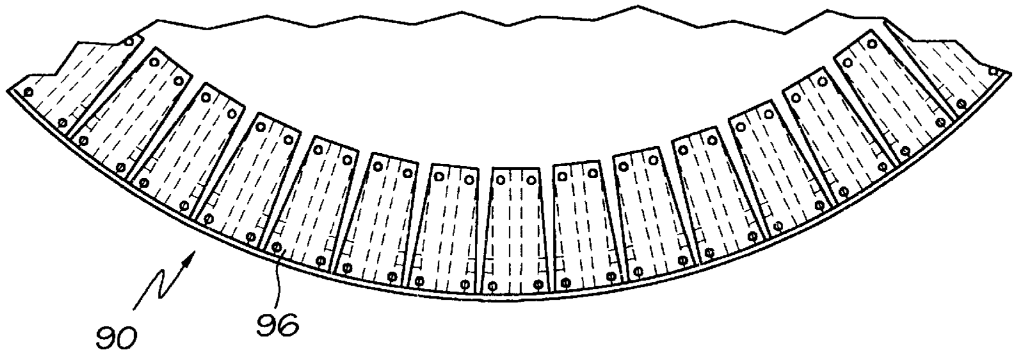
FIG. 5 is a partial top view of the outer cylinder of the present invention.

In a preferred embodiment of the invention, the collet assemblies 22 are mounted within a cylindrical frame 90 formed of a plurality of circumferentially arranged columns 96 (See FIGS. 4–5). Each column includes a row of vertically spaced of oval ports or windows 92 (FIG. 9) formed therein to receive a work piece support member 22. Each of the ports corresponds to a location to receive a collet located on the lower array 30, middle array 32 and upper array 34, respectively. The collet assemblies 22 are removable from the cylindrical frame 90 to allow replacement or repair of the collets 22.

Figure 9:
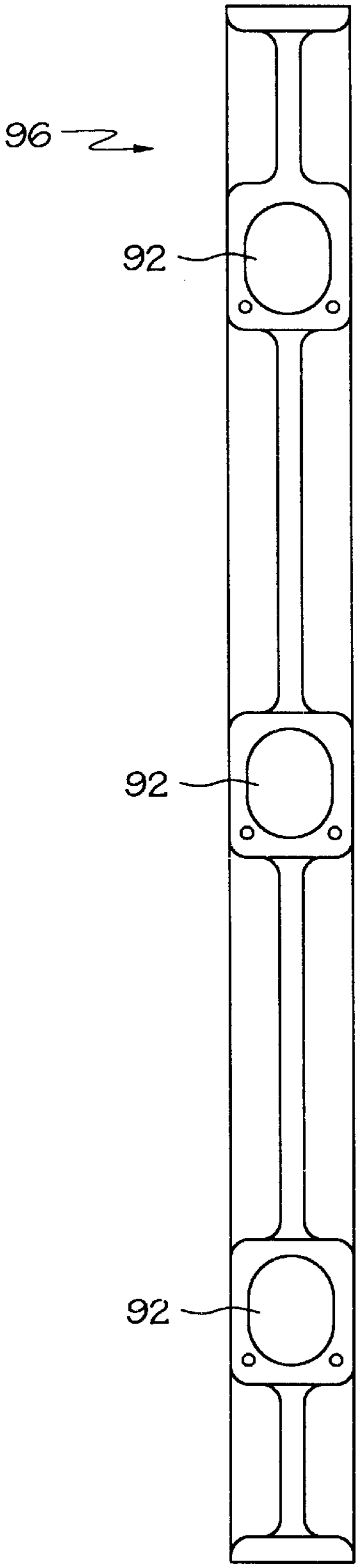
FIG. 9 is an end view of a vertical support member.
Figure 10:
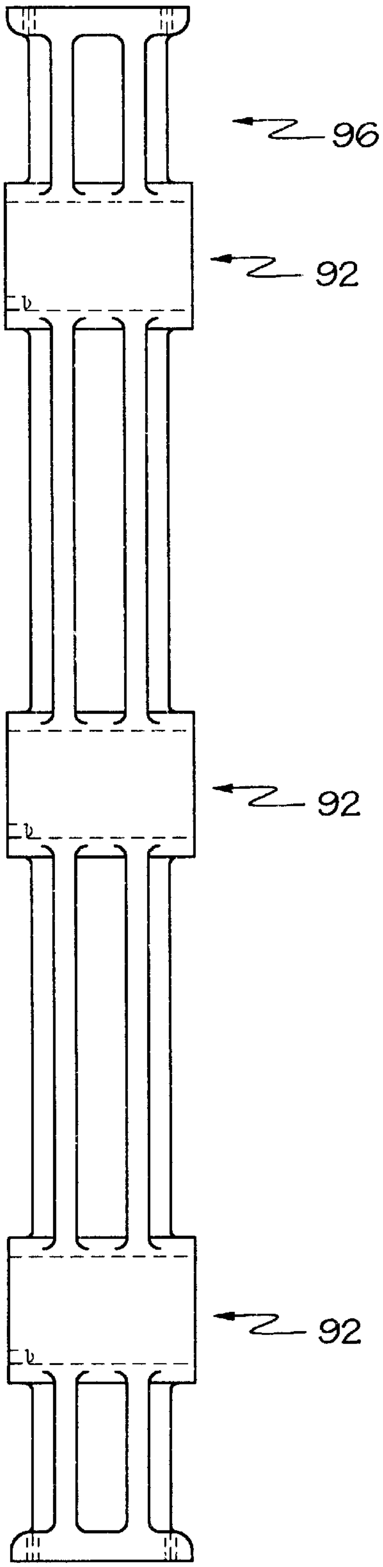
FIG. 10 is a side view of the vertical support member of FIG. 9.

The cylindrical frame 90 is constructed of a series of vertical columns 96 (FIGS. 9–10). Each column 96 may be mounted around the outer race of the turret bearing such that when a plurality of columns 96 are arranged side by side, a cylindrical frame 90 is thereby formed (See FIGS. 4–5). The cylindrical frame 90 is continually rotationally indexed about its central axis A. In one embodiment, the oven indexes about every 5 seconds, and each array has 60 collets.

Figure 11:
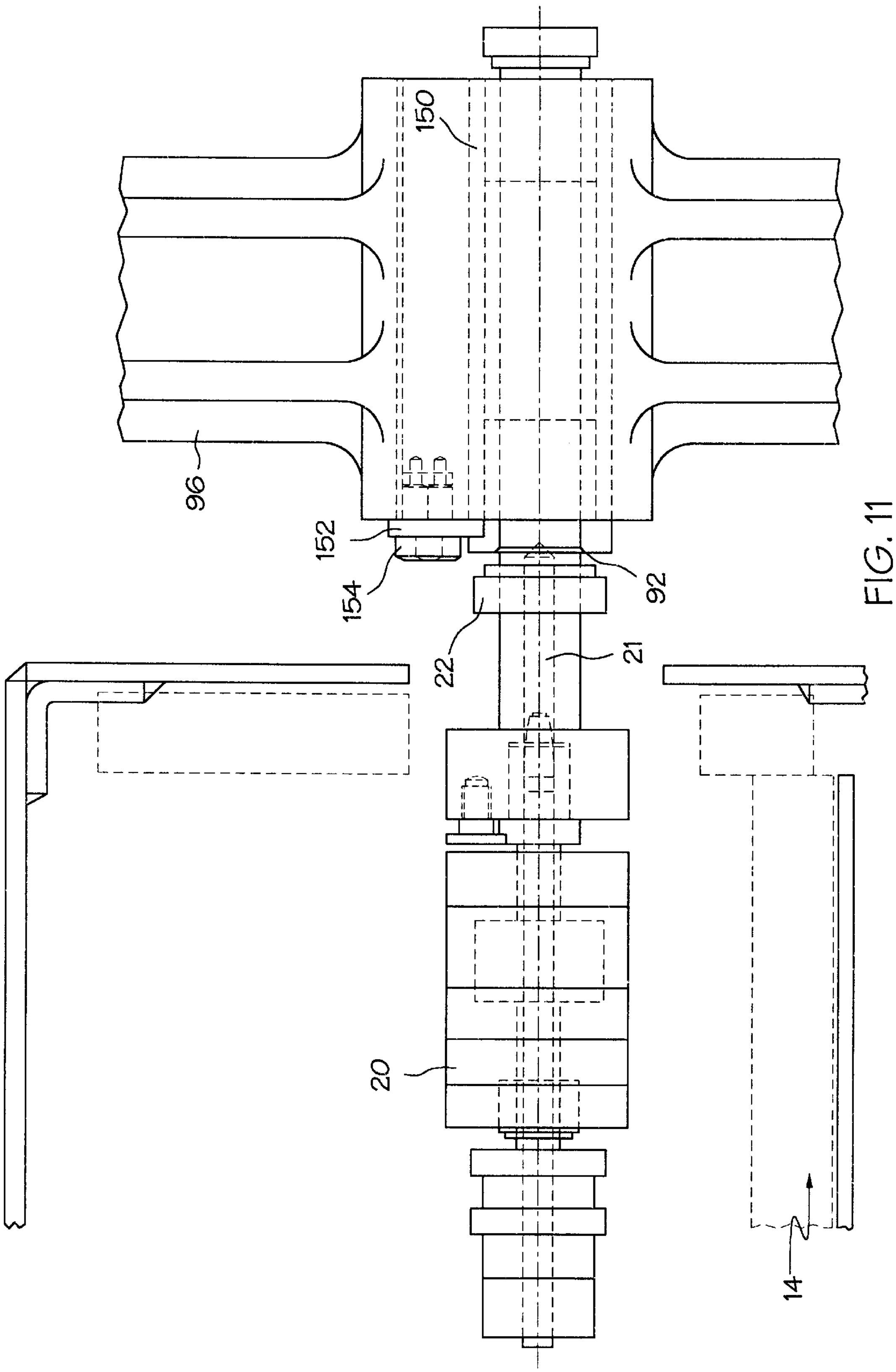
FIG. 11 is a side cross-sectional view of a work piece support member, vertical support member and heating chamber.
Figure 12:
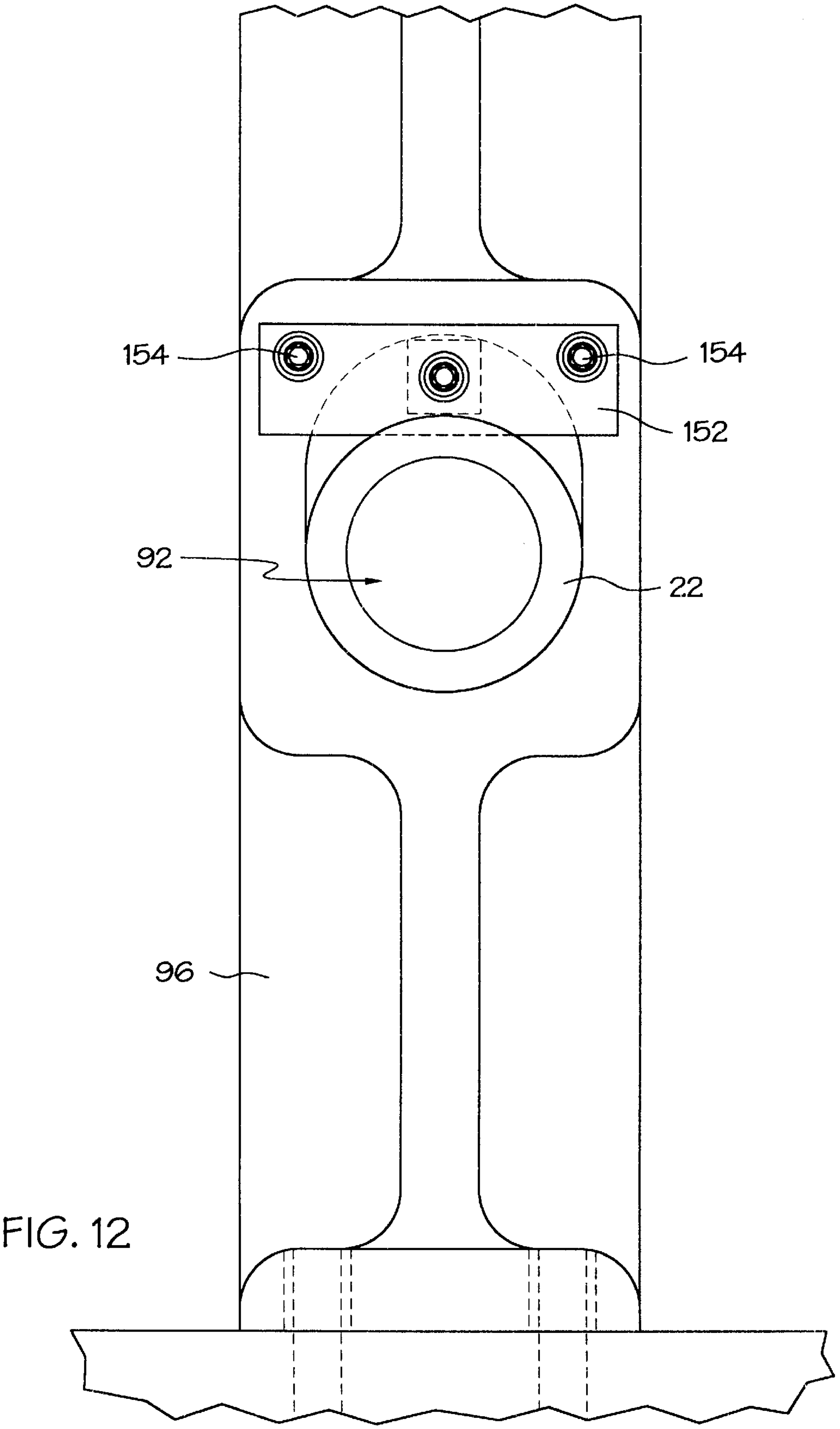
FIG. 12 is an end view of the vertical support member of FIG. 11.

As shown in FIG. 11, each work piece support member 22 is retained in position in the oval ports 92 by a key 150 which traverses the length of the bore forming the port. The key 150, in turn, is retained by a hold-down bar 152 which traverses the front of the bore and is held in place by a pair of screws 154 (FIG. 12). When it is desired to remove or replace a work piece support member 22, the screws 154 and hold-down bar 152 are removed, thereby allowing removal of the key 150. The oval shape of the bore 92 then allows the work piece support member 22 to be pivoted upwardly to disengaged the sprocket from the side flexing chain 27, allowing the collet assembly to be removed.

FIGS. 6–8 show an alternate embodiment for retaining the collet assemblies 22 within the bores 92. In the alternate embodiment, the column 96 has an angled bore 98. The angled bore 98 receives an externally threaded cylinder 95 having a spring-loaded ball detente 94. As shown in FIG. 6, the ball detente 94 extends below the upper surface of the bore 92 and is located so as to engage a groove 100 in the collet assembly 22. In this manner, the collet assembly 22 is retained within the vertical column 96. When it is desired to remove the collet 22 from the column 96, the threaded cylinder 95 and spring loaded ball 94 are removed and collet assembly 22 is tilted to disengage sprocket 17 from chain 27. Spring loaded ball 94 also acts as a compliant restraint to allow collet assembly 22 to pivot upwardly, as shown by angle 201 (FIG. 6) when the collet assembly is shifted out of position by a foreign object on the chain 27.

As best shown in FIG. 3, the heating elements 12 are mounted on adapter plates 84 which are in turn mounted to rigid semicircular plates 87. Semicircular plates 87 are in turn mounted to pivot collars 86 which allow the heating element 12, heat shrouding, and insulation to be pivoted radially outward from the center of the oven. Reflective sheets may be placed within the heating chamber 14 to improve efficiency and increase the radiant energy absorbed by the work piece. Pivot collars 86 are axially slidably supported on posts 18. This arrangement allows the pivot collars 86 to be adjusted to vary the vertical distance between the heating elements 12 and the work pieces 20. Persons skilled in the art will appreciate that there are numerous ways of accomplishing this clampable adjustment. The adapter plates allow the heating chamber 14 to be easily removed in its entirety from the oven structure for servicing. As will be discussed below, the same general mounting structure is employed at the resin application stations, whereby the trickle nozzles are releasably secured to an adapter plate that allows the same adjustment and removal as the heating elements 12 described above. It should be noted that by employing a commercially available computer or programmable controller in conjunction with the heating controls, and utilizing feedback from the heating elements, it is possible to vary the heating element temperatures in different sections of the oven based upon the knowledge of how many work pieces have been loaded into the oven, and tracking each work piece location over time. In the preferred embodiment each heating element and its accompanying heating chamber is mounted on a large pivot post that allows each individual heating section to be swung tangentially away from the annular arrays. Heating elements can be safely changed or adjusted while the machine is cycling. In a still more particular embodiment of the invention, each of the heating elements is identical and can be placed in any heating location of the oven. The invention enables the adjustment, removal and replacement of entire oven sections, including the heating element, the heat baffle shrouding and the insulation.

Figure 14:
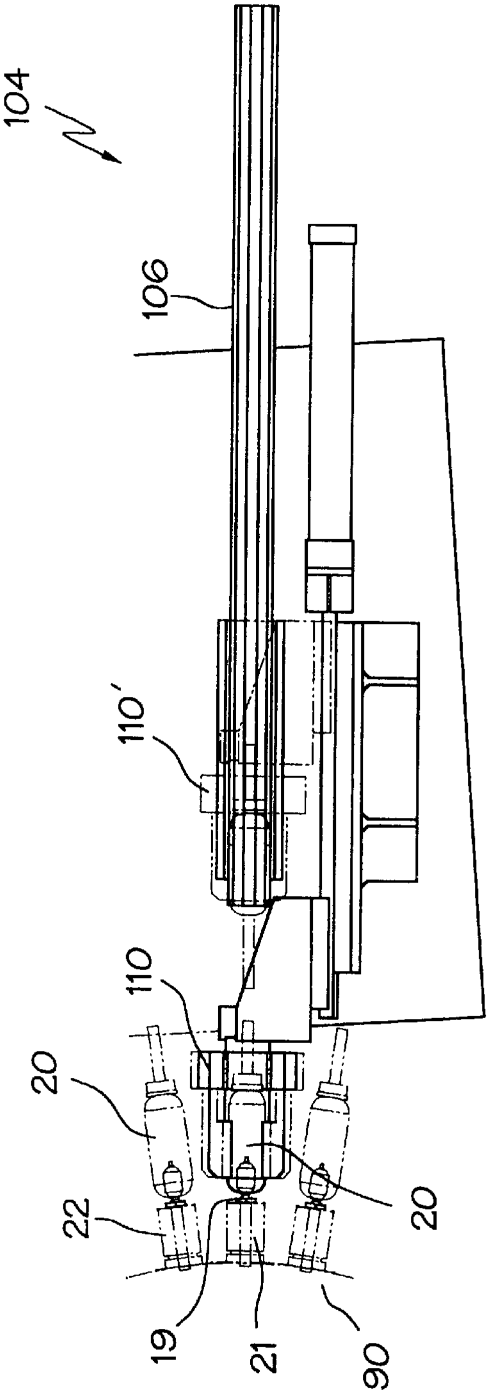
FIG. 14 is a top view of the loading assembly of FIG. 13.
Figure 13:
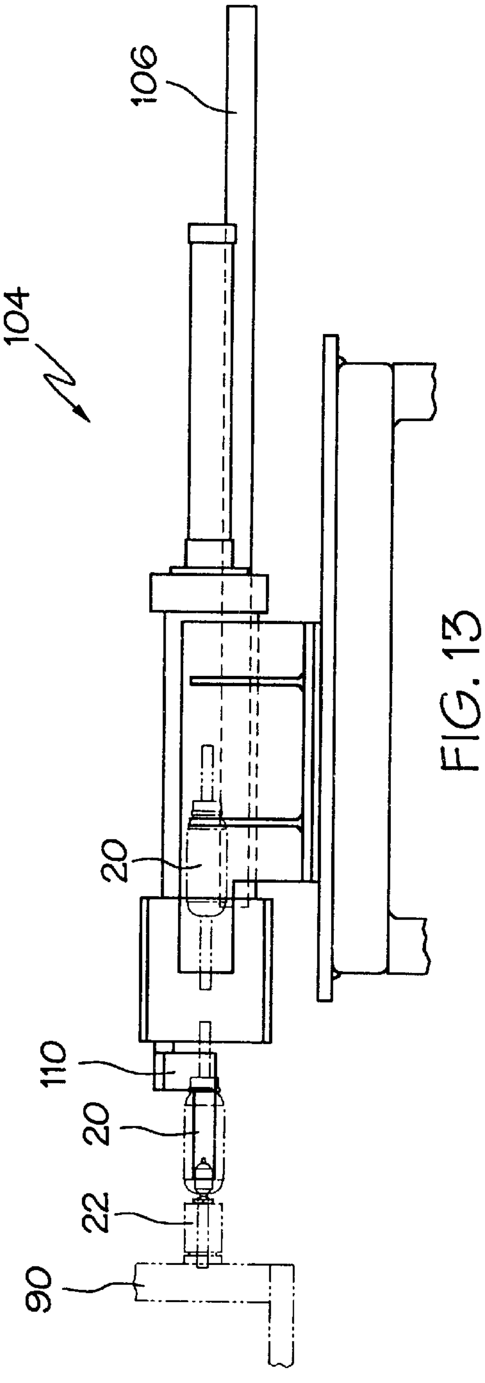
FIG. 13 is a side view of a loading assembly for use in conjunction with the oven of the present invention.

A loading assembly 104, shown in FIGS. 13–14, loads work pieces into the oven. Loading assembly 104 includes a horizontally oriented bar 106 having a generally v-shaped profile. A series of work pieces 20 may be manually or automatically placed upon the loading bar 106. A pusher bar (not shown) reciprocates along the length of the loader bar 106 to contact and push work pieces 20 on the loading bar towards the oven. In this manner, work pieces 20 are pushed down the end of the loader bar 106 towards the loader gripper 110. Once the work pieces reach the end of the loader bar 106, the loader gripper 10 grips, lifts, and inserts the work piece 20 into an associated work piece support member 22. The split bushing 19 of the collet assembly 22 receives the shaft 21 of the work piece 20. The position of the loader gripper assembly 110 as it inserts a work piece into the collet is shown in FIG. 14, and the position of the gripper when it lifts a work piece 20 off the bar 106 is shown as 110'.

Figure 15:
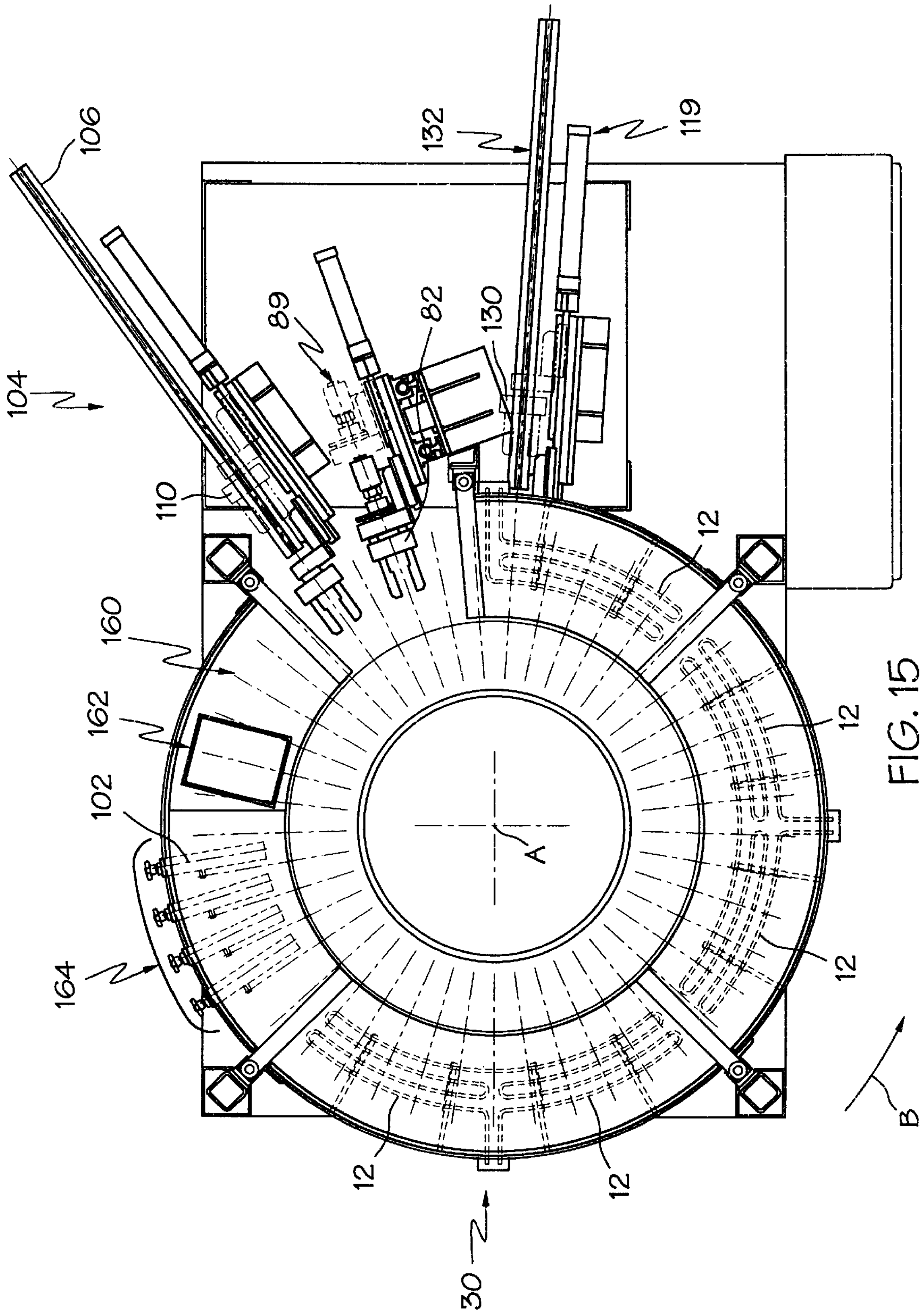
FIG. 15 is an overhead view of the lower array of the rotary oven of FIG. 2.
Figure 16:
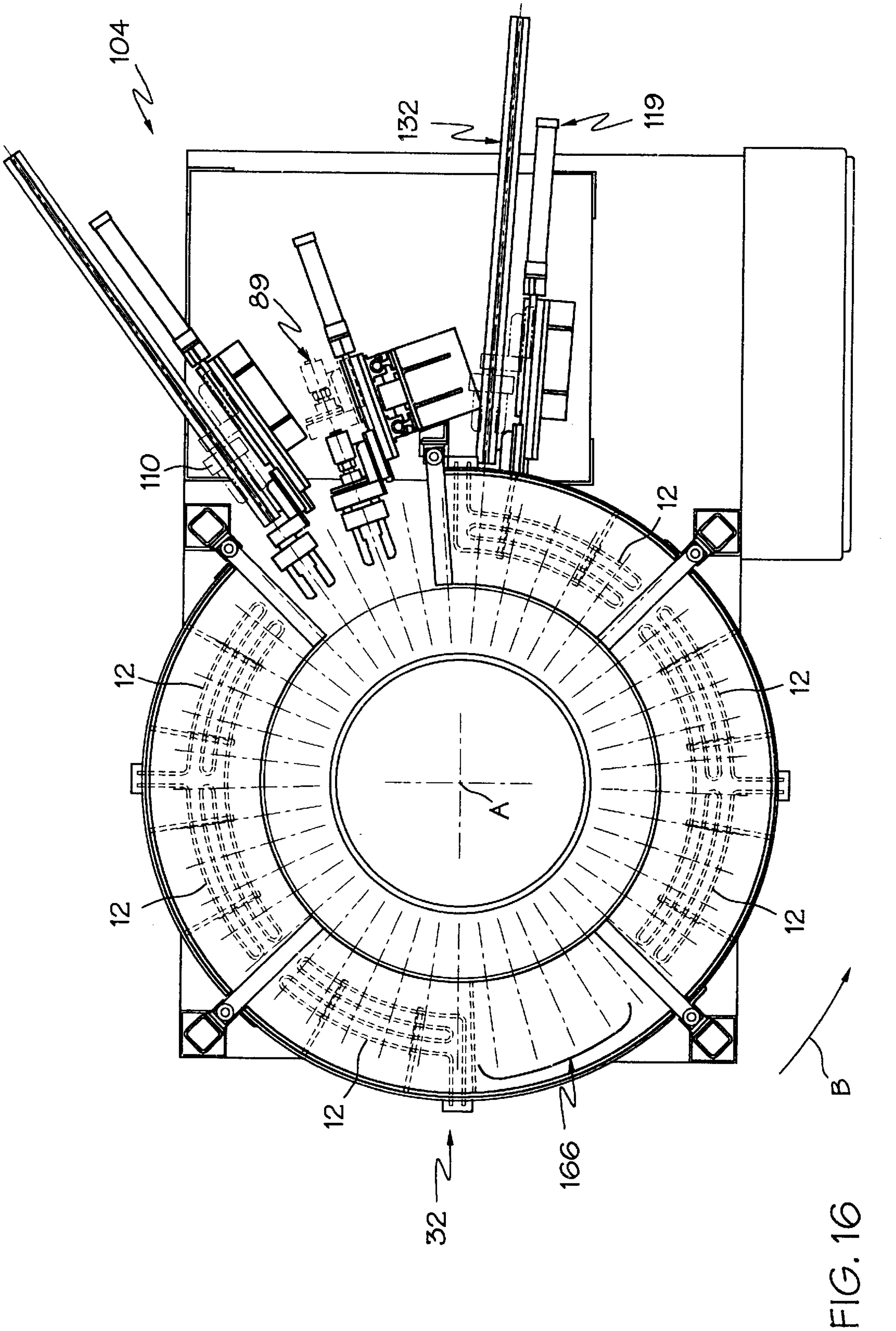
FIG. 16 is an overhead view of the middle array of the rotary oven of FIG. 2.
Figure 17:
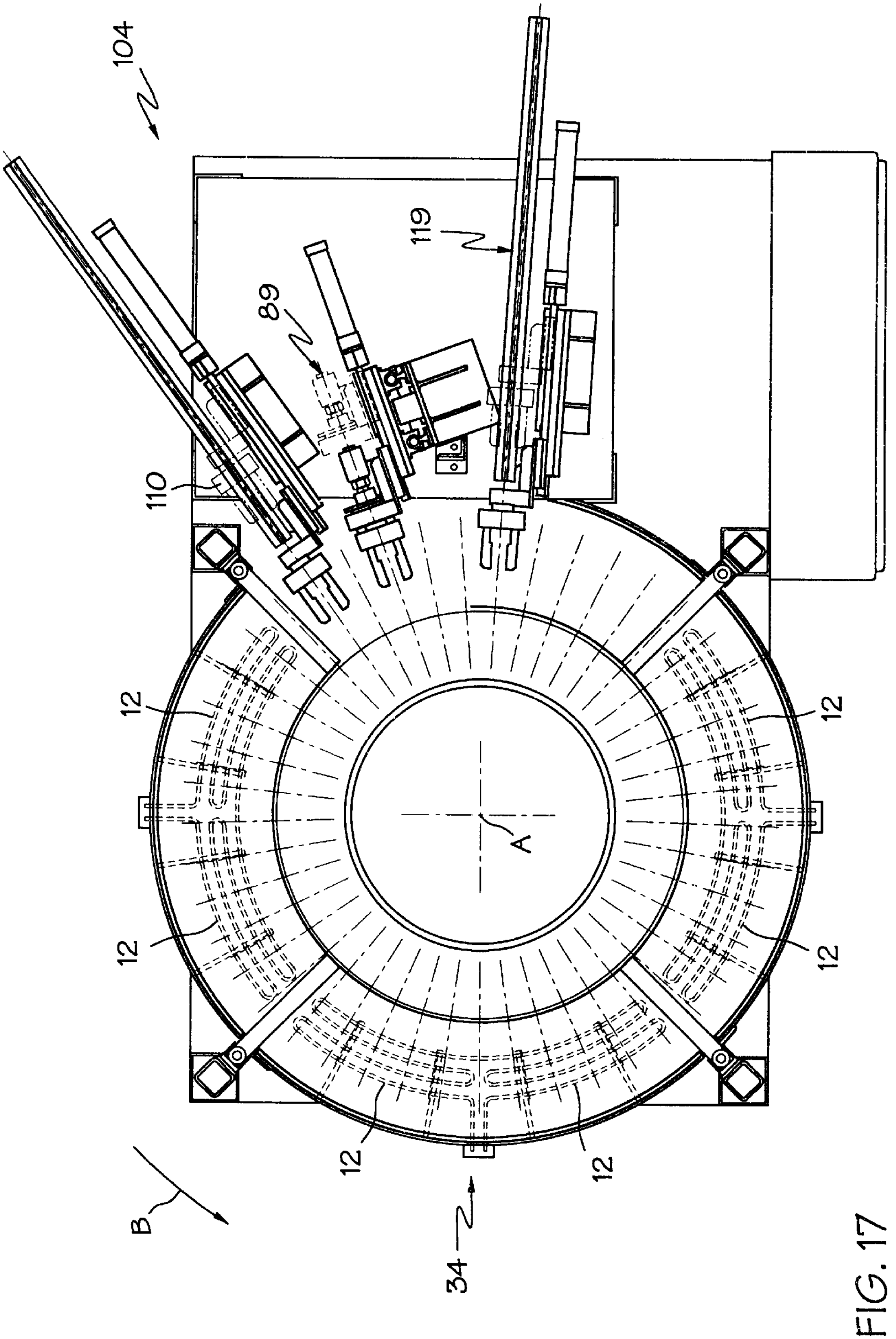
FIG. 17 is an overhead view of the upper array of the rotary oven of FIG. 2.

The steps of the heating and curing process of a work piece 20 in one embodiment are as follows, and are illustrated in FIGS. 15–17. A work piece 20 is first loaded into a work piece support member 22 resting on the lower array 30 by the loading assembly 104 as described above. Once a work piece is loaded on the lower array 30, the array is then step-wise indexed about its central axis A in the direction indicated by the arrow B. One work piece support member width is indexed at a time on the outer race 28 as was discussed in detail above. After loading the work piece onto the lower array 30, it may be desirable to apply a base coat of UV curable resin. In one embodiment, the UV curable resin is applied at location 160 as shown in FIG. 15. The UV curable resin is preferably applied to the exposed wires of an armature near the tangs of the commutator. Immediately following application of the UV curable resin at 160, a "flash cure" can be used to cure the resin at location 162. The flash cure can be accomplished using a UV light mounted below the lower array 30 and oriented such that the freshly applied resin is exposed to the UV light.

Once the UV cure is complete, resistance heat may be applied to the work piece by the brushes 102 at location 164. The brushes 102 are mounted within the oven in a releasably secured fashion. Preferably, a pair of brushes are mounted on either side of the path of the work piece 20. The resistance heating brushes 102 are spring biased inwardly to ensure contact with the work piece as the work pieces pass through the oven 10. The brushes are adjustable in the axial direction, with respect to the work piece, to accommodate work pieces of varying lengths. The resistant heating brushes 102 contact the work piece 20 and pass a current through the work piece. After the resistance heat is applied, the work piece 20 is then indexed the remaining revolution of the lower array 30 while passing under the heating elements 12, which continue to heat the work piece 20.

Each work piece 20 is then elevated to the middle array 32, illustrated in FIG. 16. A transfer assembly 89 moves the work pieces from one array to another, and will be discussed in greater detail below. Once on the middle array 32, a work piece 20 continues to be heated by the radiant heating elements 12. At a designated point while being indexed about the middle array, shown approximately by location 166, the resin is applied to the work piece during the trickle stage. A plurality of resin nozzles can be located above the work pieces 20 at this stage in the oven. There are four individual trickle stations (not shown) that combine to create the entire "trickle stage." At each of the four trickle stations, resin is dripped from two separate nozzles onto the work piece 20 below. The resin is delivered from a resin reservoir (not shown) to the nozzles by use of a peristaltic pump (not shown). Those skilled in the art will appreciate that a wide variety of resin application systems and processes may be used to deliver and apply the resin. Additionally, the application of the resin may be computer controlled to vary the application of resin for varying conditions and types of work pieces. During the remainder of its indexing cycle on the middle array 32, the work piece is passed under the heating elements 12 to cure the resin.

Once the second indexing cycle is completed, the work piece 20 is then removed from the middle array 32 and elevated to the upper array 34 by the transfer assembly 89.

It is then placed in a work piece support member 22 on the upper array 34 and again indexed nearly a full revolution, while passing under the heating elements 12 to cure the resin, as shown in FIG. 17. At the end of a nearly full revolution at the upper array 34, the cured work piece is then unloaded from the oven by an unload assembly 119, which will be discussed in detail below.

Figure 18:
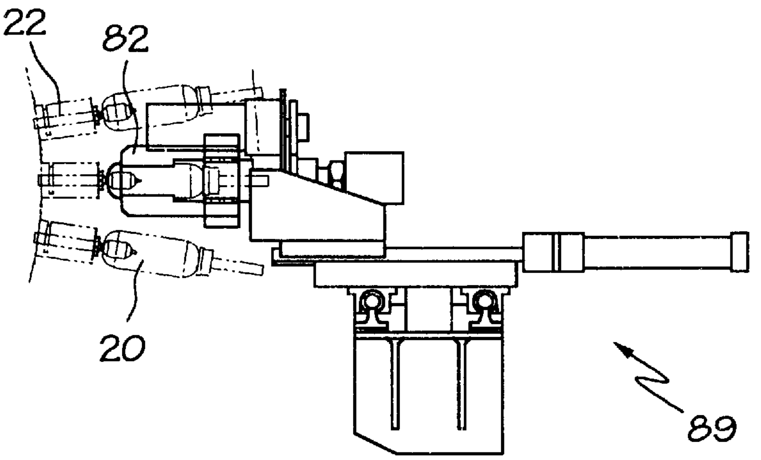
FIG. 18 is a top plan view of a transfer assembly for use in conjunction with the present invention.
Figure 19:
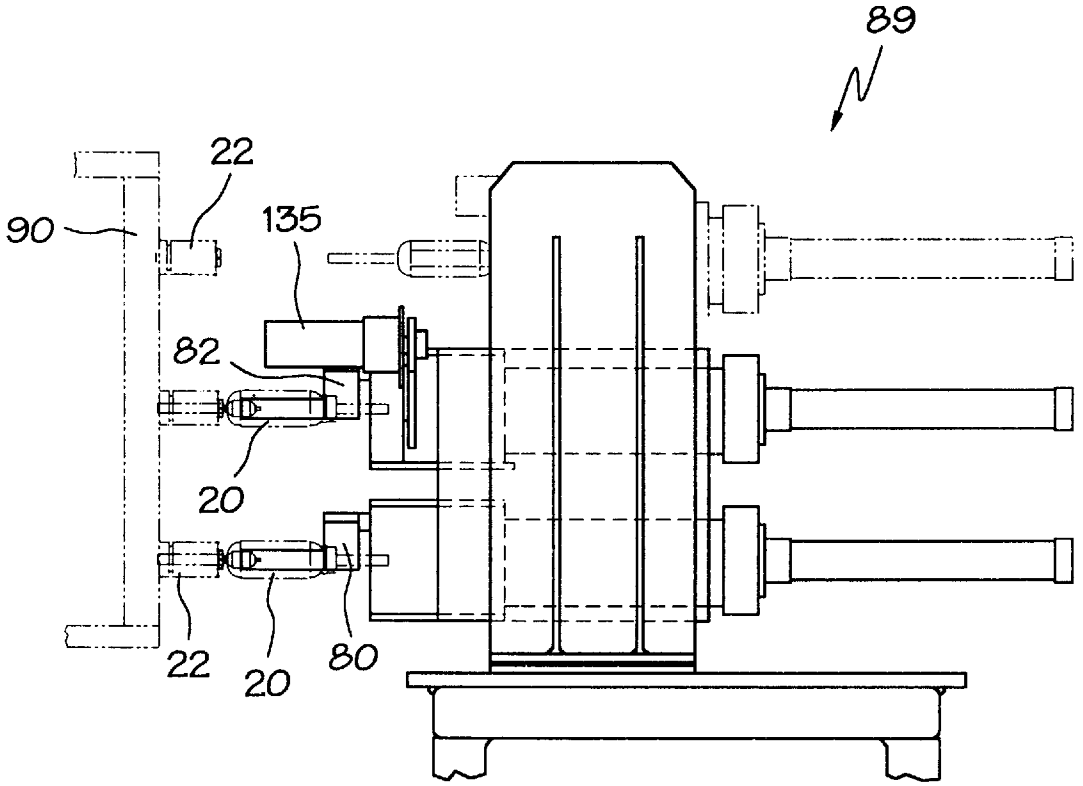
FIG. 19 is a side view of the transfer assembly of FIG. 18.

The transfer assembly 89, shown in FIGS. 18–19, is used to grip the work pieces 20 and transport them from a one array to another. FIG. 19 illustrates a transfer assembly having a pair of grippers 80, 82. In the present embodiment, lower transfer gripper 80 transports work pieces from work piece support members resting on the lower array 30 to the middle array 32. Middle transfer gripper 82 transports work pieces from work piece support members resting on the middle array 32 to the upper array 34. In an alternate embodiment, an upper transfer gripper (not shown) may be used to lift work pieces out of the work piece support members resting on the upper array 34 and place them on an auxiliary storage disk located above the upper array 34.

Lower transfer gripper 80 is rotatably secured in a bearing such that it is able to "free-wheel". When the transfer gripper 80 grips the work piece 20 contained in work piece support member 22, the bearing allows the gripper to rotate to match the speed at which the work piece is rotating. Once the work piece 20 is detached from the work piece support member 22 and held solely by the gripper, the gripper and work piece will stop rotating. This rotation minimizes damage to the work piece 20.

When a work piece is lifted off of the middle array 32 by the middle transfer gripper 82, the resin is still freshly applied at that point in time and the rotation of the work piece 20 must be maintained at a minimum level to ensure even curing. Thus, middle gripper 82 is rotated by a drive mechanism 135. The drive mechanism 135 is equipped with a form sprag one-way clutch such that it is able to free-wheel. The drive mechanism 135 can be set to rotate gripper 82 at a speed slightly slower that the rotational speed of the work piece support member 22. When gripper 82 clamps on work piece 20, the form sprag allows gripper 82 to free wheel and match the speed of the work piece 20. Gripper 82 will then slow down to the speed of the drive mechanism 135 when work piece 20 has been removed from the work piece support member assembly 22. In a preferred embodiment, the middle gripper 82 and lower gripper 80 are coupled in their vertical movement. In this manner, a work piece removed from the middle array 32 by the middle gripper 82 leaves an opening on the middle array which is immediately replaced by a work piece elevated from the lower array 30 by the lower gripper 80.

Figure 20:
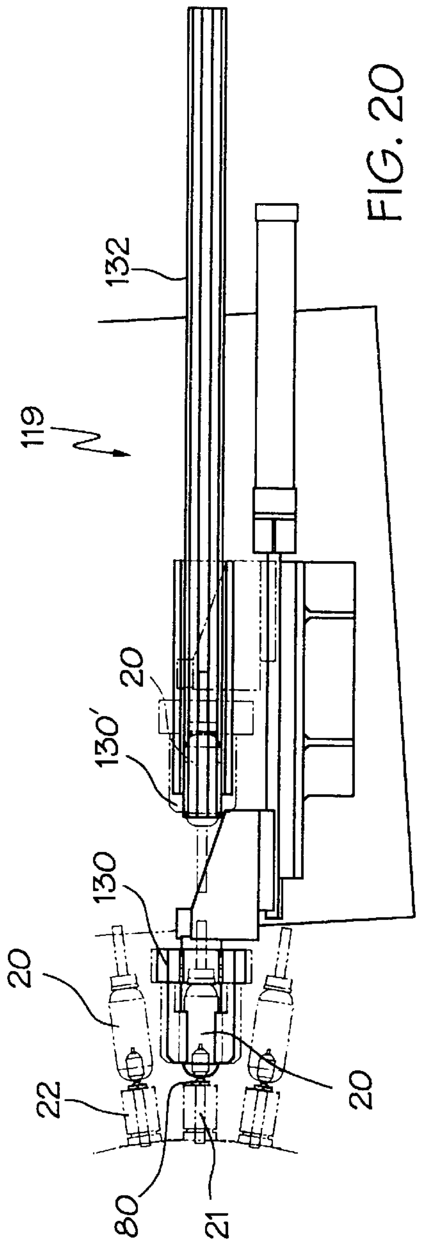
FIG. 20 is a top plan view of an unload assembly for use in conjunction with the present invention.
Figure 21:
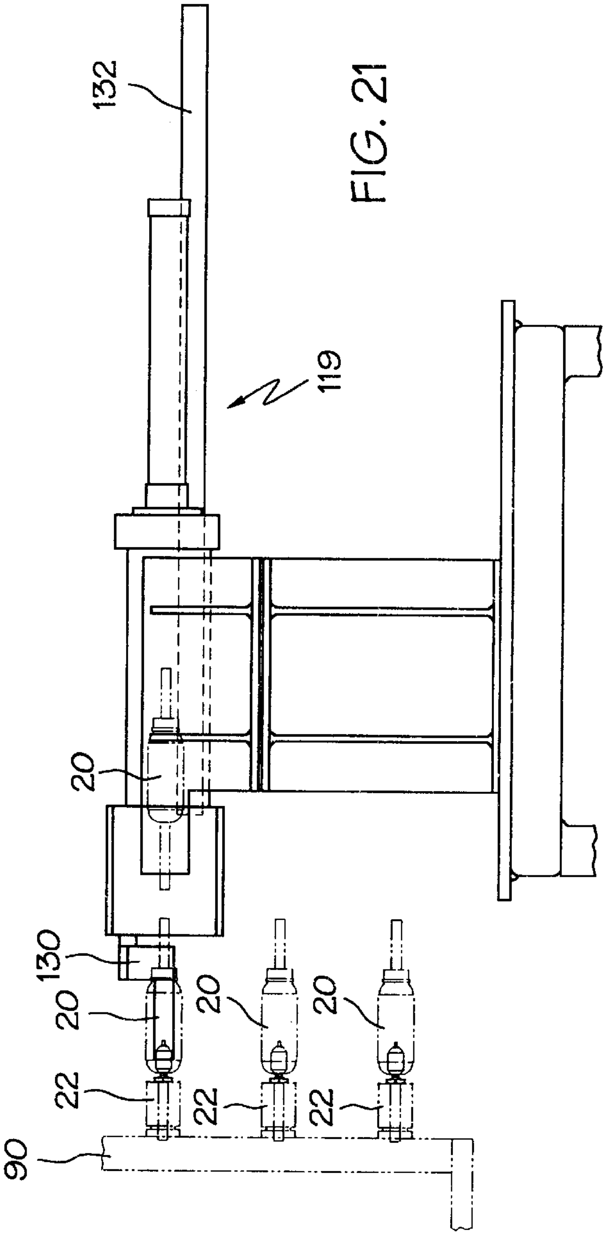
FIG. 21 is a side view of the unload assembly of FIG. 20.

Once the work pieces have been appropriately cured, they are removed from the upper array 34 by an unload assembly 119 shown in FIGS. 20–21. The unload assembly 119 includes an unload gripper 130 which grips the work piece 20 and removes it from the split bushing 80 of the work piece support member 22. The work piece 20 is then moved radially away from the oven and placed in an unload bar 132 having a "V" shaped profile, similar to the loading bar 106 used with the loading assembly 104. The position of the unload gripper 130 after it deposits a work piece 22 on the unload bar 106 is shown in FIG. 20 as 130'. A row of work pieces 20 may be loaded upon the unload bar 132 and are moved radially away from the oven 10 as more work pieces are added. By the time the work pieces have been placed on the unload bar 132, the work pieces have been appropriately cured and can thereby be removed manually or automatically. A sensor may be provided at the end of the unload bar 132 to notify the operator when the bar is filled with work pieces.

The oven 10 is described herein as having a lower array 30, middle array 32 and upper array 34. The work pieces are loaded on the lower level, work their way up to the upper level, and are then unloaded. However, those skilled in the art will appreciate that the order of operations may be reversed. Thus, it is within the scope of the present invention to provide for an oven wherein the work pieces are loaded upon the upper array, moved downwardly to the middle array; lowered again to the lowermost array; and then removed from the oven. This alternate embodiment may be desirable because the UV light used to cure resin can be mounted above the work pieces on the upper level. In this manner, the UV light is located in a position which is easier to mount and access, and avoids having the freshly-applied resin drip on the UV light. Further alternately, it may be desirable to drive the final array in the opposite direction from the previous arrays.

In an alternate embodiment of the present invention, a partial vacuum may be created within the trickle section 166 of the oven 10 when the resin is applied to the work piece 20. The partial vacuum increases the resin's saturation of the windings, and helps to fill up any voids within the windings. Further alternately, the work piece support members 22 may be angled upwardly during the trickle stage 166 so that gravity aids the resin to further permeate the windings.

Figure 22:
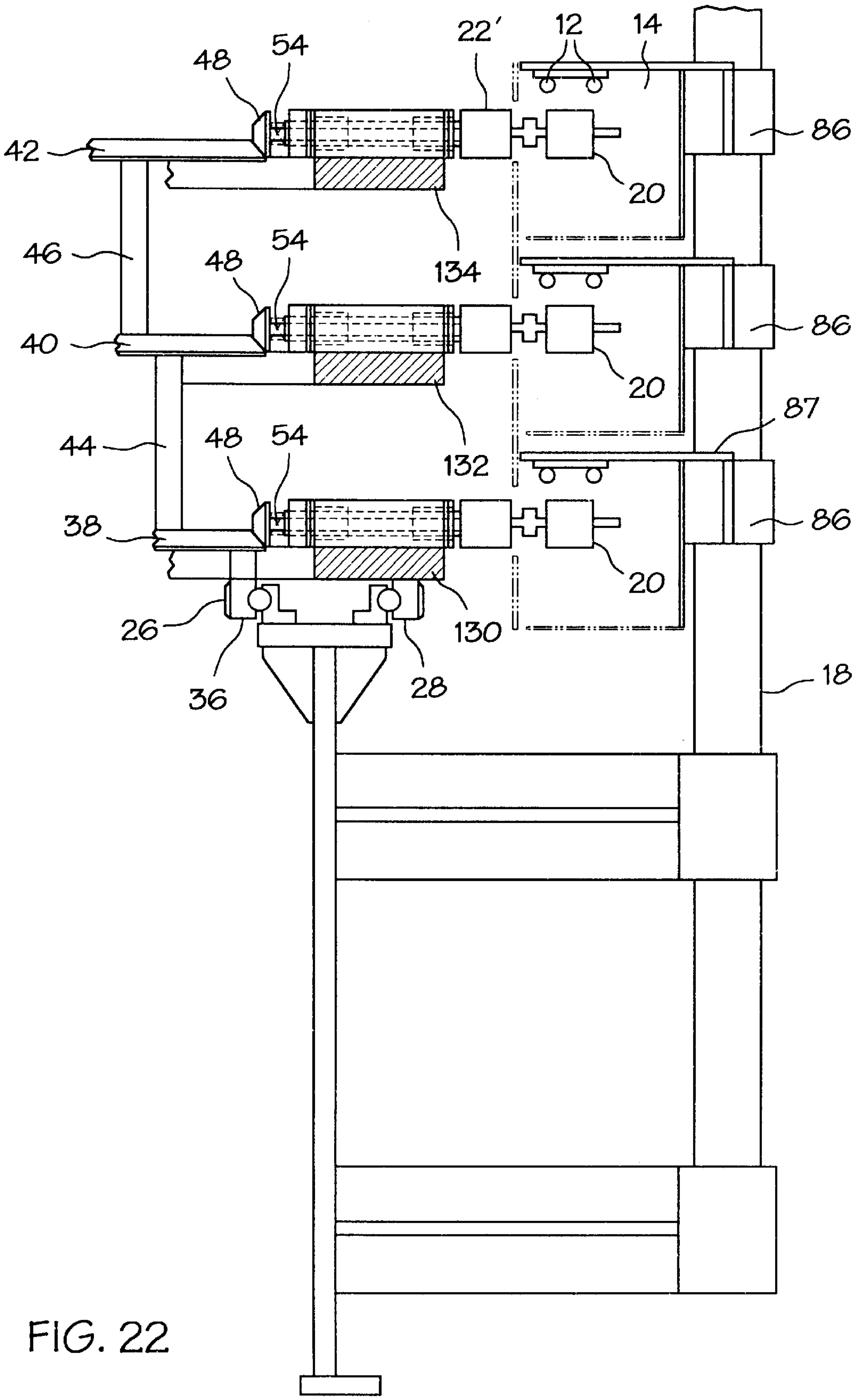
FIG. 22 is a cross-sectional view of an alternate embodiment of the oven of the present invention.

In an alternate embodiment of the invention, as shown in FIG. 22, rings 38, 40 and 42 having beveled outer surfaces are utilized in place of the rings 31, 33, 35. The beveled outer surfaces of the rings 38, 40, 42 frictionally engage the correspondingly beveled heads 48 of the alternate collet assemblies 22'. The beveled heads 48 of the collet assemblies 22' are pressed into contact with the beveled rings by springs. Thus, as the beveled rings 38, 40, 42 are rotated, the frictional forces between the beveled rings and the beveled heads 48 causes the beveled heads to rotate. This in turn causes the collets 22' and their corresponding work pieces 20 to rotate about their central axis as they are indexed. Beveled rings 38, 40, 42 can also take the form of beveled gears, and the beveled heads 48 would also then be replaced with beveled gears.

Rings 38, 40 and 42 are supported by inner race 36 of turret bearing 26. Inner race 36 is rotated by a pinion (not shown) that meshes with the teeth of inner race 36. The rotation of inner race 36 rotates the lower ring 38, which is mounted on inner race 36. The rotation of inner race 36 also rotates the rings 40 and 42 which are rigidly connected to the ring 38 by cylindrical columns 44 and 46. It should be noted that by placing another turret bearing on either column 44 or 46, rings 40 or 42 may be rotated at speeds independent from the other rings.

Figure 23:
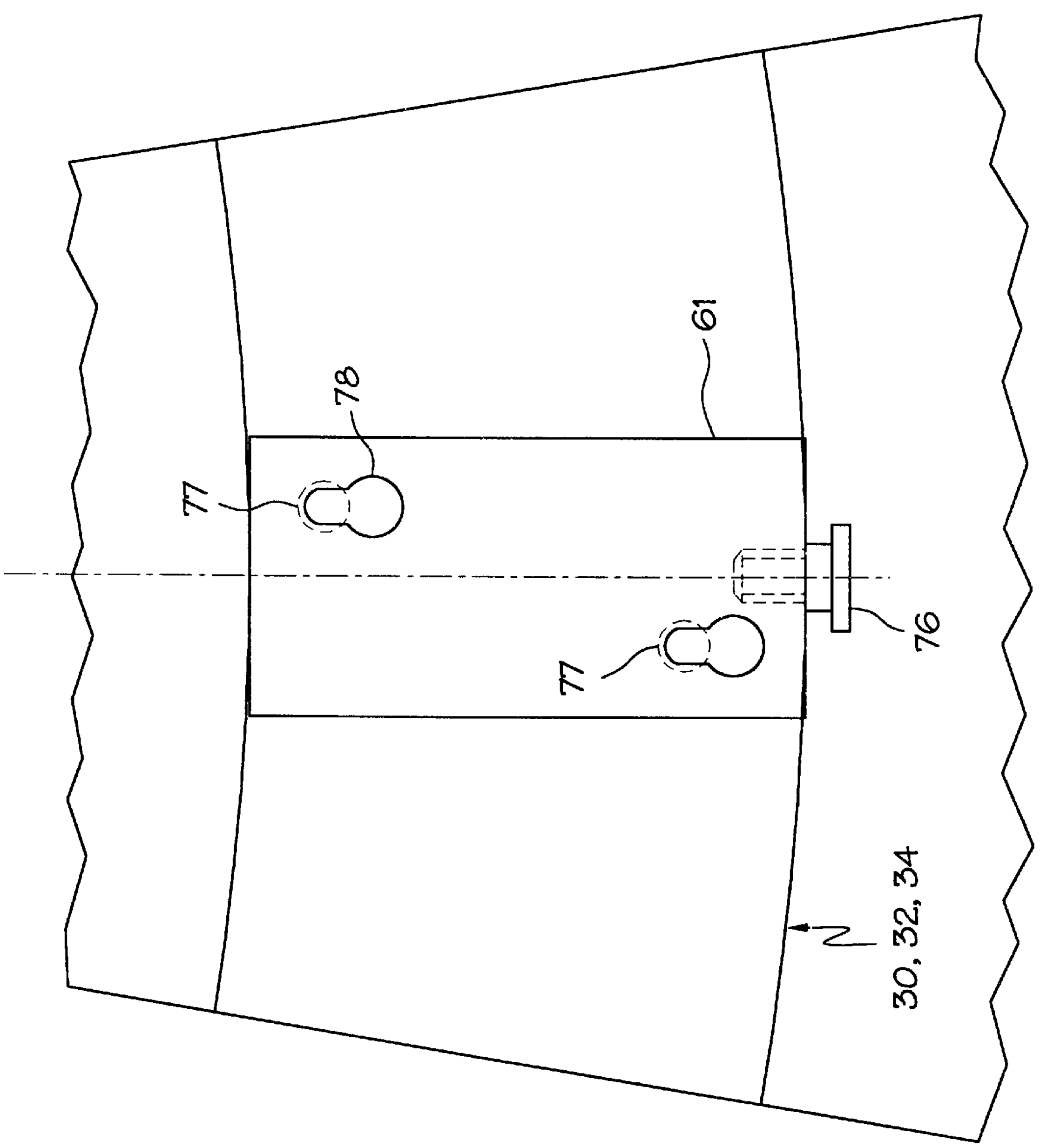
FIG. 23 is a top view of a collet mounting assembly for use in an alternate embodiment of the present invention.

The collet assemblies 22' are mounted on annular platforms 130, 132, 134. In order to allow for easier repair of the collet assemblies 22', the collet assemblies 22' are preferably removably mounted on each platform. FIG. 23 is a simplified view showing an embodiment of the removable mounting of collet body housing 61 on support rings 130, 132 and 134, respectively. In the operating position, the heads of the collet body mounting screws 77 are lodged in the lower portion of the keyhole slots 78 in the support rings. To remove the work piece support member, axial clamp screw 76 is loosened just enough to allow mounting screw heads 77 to move forward in keyhole slot 78 to a point where the screw head is clear to be lifted through the larger diametrical portion of the keyhole slot 78.

Figure 24:
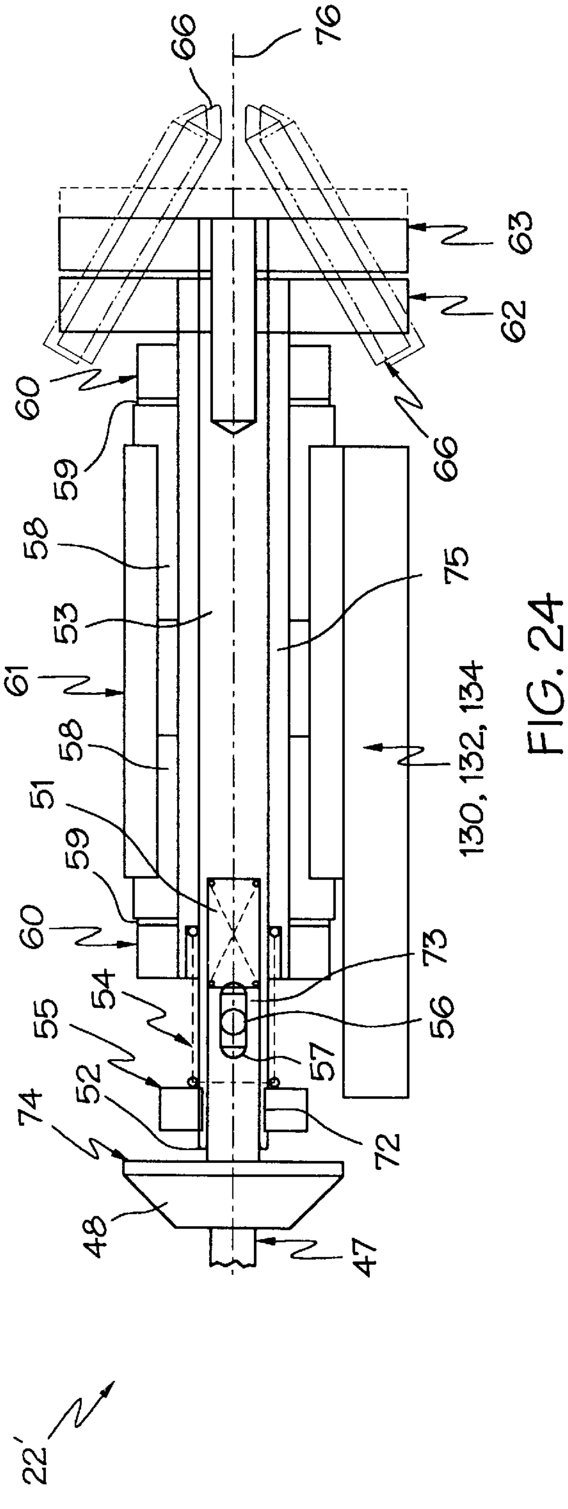
FIG. 24 is a cross-sectional side view of an alternate collet assembly for use in the present invention.
Figure 26:
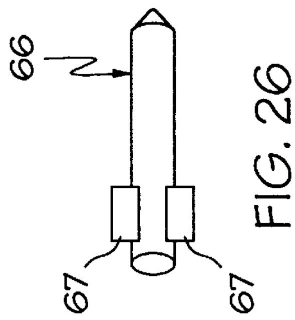
FIG. 26 is a side view of a gripper pin of the collet assembly of FIG. 24.
Figure 25:
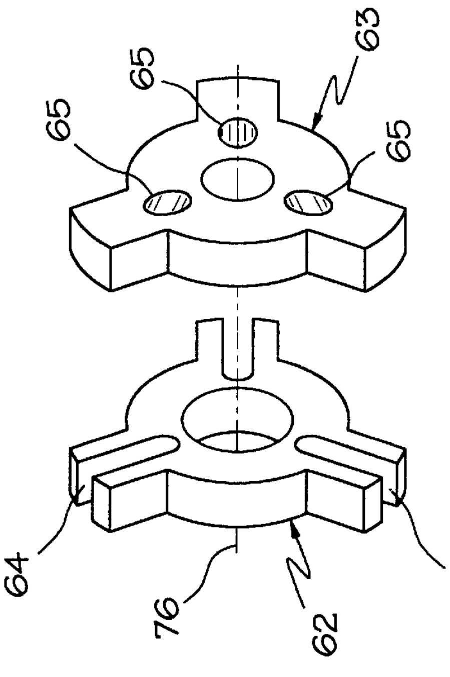
FIG. 25 is an end view of a slotted head and a pin wedge head of the collet assembly of FIG. 24.

FIGS. 24–26 show an embodiment of an alternate work piece support member 22'. Gripper pins 66 hold the work piece 20 in place as it is indexed about the oven 10. When sufficient pressure is applied to the flat head of beveled head 48, the work piece is released by the gripper pins 66, and thus may be removed. In the alternate embodiment, an air cylinder or other similar apparatus (not shown) is mounted towards the center of the annular arrays and may press axially via rod 47 on bevel head 48. Bevel head 48 is an integral component with shaft 73, and thus the shaft 73 moves axially when the air cylinder presses on the bevel head 48. Shaft 73 thus compresses spring 51 until flat surface 74 of the bevel head 48 contacts the end 52 of center shaft 53. At this point, bevel head 48 is no longer in contact with bevel rings 138, 140 or 142, and thus is no longer being rotated. As the urging means continues forward, center shaft 53 is displaced axially with respect to the stationary outer shaft 75 and spring 54 is compressed between outer shaft 75 and split collar 55. Split collar 55 is recessed into annular groove 72 on center shaft 53. As center shaft 53 moves axially forward, pin wedge head 63 (FIG. 24), being mounted to center shaft 53, also moves forward. The movement of center shaft 53 causes the gripper pins 66, which are slidably secured in holes 65, to move radially outward from center line 76.

A pair of diametrically opposed angled slots 67 are located towards the rear of gripper pins 66 and contact with the front and rear vertical faces of outer shaft slotted head 62. The angled slots 67 are slidably retained in radial slots 64 located on the outer shaft of slotted head 62 (FIG. 24). Pin wedge head 63 is axially disposed from the stationary outer shaft slotted head 62, and gripper pins 66 are disposed radially from center line 76 allowing for work pieces of larger size to be secured or released.

As the urging means is retracted, spring 54 urges center shaft 53 to move axially rearward with respect to stationary outer shaft 75. Pin wedge head 63 moves axially closer to outer shaft slotted head 62 and the gripper pins 66 move radially closer to center line 76. The gripper pins 66 will continue to move towards the center line 76 until they contact the work piece, at which point spring 54 continues to cause gripper pins to apply a gripping force on the work piece.

As the urging means continues to retract, spring 51 urges shaft 73 and bevel head 48 to make contact with bevel rings 38, 40 or 42. As bevel head 48 makes contact with the bevel rings 130, 140, or 142 drive pin 56, securely mounted in shaft 73 and slidably retained in slot 57, imparts a torque about center line 76 that causes the inner shaft 53, along with outer shaft 75, to rotate about center line 76. This causes the gripper pins 66 and the work piece to be rotated. Outer shaft 75 rotates in hardened bearings 58, which in this embodiment of the invention are common drill bushings. Outer shaft 75 is also hardened and polished such that it can rotate freely in hardened bearings 58 for extended periods of time without the aid of lubricating substances, which minimizes the need for maintenance. Outer shaft 75 is axially retained in collet body housing 61 by thrust bearings 59 and split collars 60. Those skilled in the art will appreciate that any frictional engagement may be used to grip and retain the work pieces.

In a preferred embodiment of the invention, exhaust stacks are placed at the top of the oven to exhaust gases from the oven. Additionally, a fire detection and $CO_2$ fire response system may be used to detect and counteract any fires that may flare up within the oven.

In a still more particular embodiment of the invention, the work piece support members are rotated as they are transported in the oven. For example, the work piece support members may be carried on a shaft which is rotated by a drive member which is mounted on the inner race of a second turret bearing. The inner surface of the second turret bearing has teeth that are driven by a second pinion, independent of the first turret bearing and first pinion. A third turret bearing, displaced axially from the second turret bearing, with yet another collet driving member and driven by a third pinion, will allow for work piece support members on separate annular arrays to be rotated at different speeds with respect to each other.

In a still more particular embodiment of the invention, the removal of an individual work piece support member for maintenance or replacement can be accomplished by the loosening of two mounting screws and the loosening of one central clamping screw. None of the screws need to be removed in order to facilitate work piece support member removal. Further, since the heating sections pivot open, a work piece support member can be removed while the machine is cycling. This avoids having to employ the product from the machine in order to service a work piece support member.

In a still more particular embodiment of the invention, additional annular arrays and work piece support members can be added axially above the processing arrays of the machine that will allow for the storage of in-process work pieces that can not be unloaded from the oven due to down-line stoppages. This particular feature eliminates the need for additional storage which requires additional floor space. It is also possible to use the upper process arrays as a cooling chamber that will return the work pieces from the 375° F. plus degrees of the oven to a workable ambient temperature. It is well known within the art that work piece temperatures above 120° F. can greatly degrade the effectiveness and repeatability of many of the down-stream process after impregnation.

While the forms of the apparatus herein described constitute a preferred embodiment of the invention, it is to be understood that the present invention is not limited to these precise forms and that changes may be made therein without departing from the scope of the invention.

What is claimed is:

1. A rotary conveyer comprising:

an annular array of a plurality of circumferentially spaced work piece support members for receiving a corresponding plurality of workpieces;

a first drive ring coaxially associated with said array for rotating said work pieces in said work piece support members; said first drive ring being rotatable with respect to said array such that relative movement between said first drive ring and said array causes the work pieces to rotate; and means for rotating said array.

2. The rotary conveyor of claim 1 wherein each work piece support member further includes means for rotating said work pieces in said work piece support members and wherein said drive ring imparts rotary motion to said means for rotating said work pieces.

3. The rotary conveyor of claim 1 wherein said means for rotating said array rotates said array in a step-wise index.

4. The rotary conveyor of claim 2 wherein said conveyor includes a plurality of annular arrays of circumferentially spaced work piece support members for receiving a plurality of work pieces therein, each work piece support member including means for rotating said work pieces in said work piece support members, each array being axially spaced from one another, said conveyor further including plurality of corresponding drive rings associated with each array for driving said means for rotating said work pieces.

5. The rotary conveyor of claim 4 wherein each drive ring has a chain about its periphery and wherein said means for rotating said work piece support member includes a sprocket on the radially inward end of each work piece support member such that said sprockets mesh with said chain.

6. The rotary conveyor of claim 5 wherein each work piece support member includes a collet.

7. The rotary conveyor of claim 6 wherein each work piece support member is positioned in said array such that a work piece received in each member extends radially outwardly from said member.

8. The rotary conveyor of claim 4 wherein at least one of said arrays is rotationally coupled to another of said arrays such that said arrays rotate together.

9. The rotary conveyor of claim 4 wherein at least one of said arrays moves independently of another of said arrays.

10. The rotary conveyor of claim 1 wherein said means for rotating said arrays comprises an indexer.

11. The rotary conveyor of claim 7 further including at least one heating element, said heating element being positioned at the periphery of at least one of said arrays such that said heating element heats work pieces retained in selected ones of said work piece support members.

12. The rotary conveyor of claim 11 wherein said at least one heating element is mounted within a heating chamber, said heating chamber being outwardly pivotable.

13. The rotary conveyor of claim 1 wherein said conveyor includes a plurality of heating elements positioned about the periphery of said array.

14. The rotary conveyor of claim 13 wherein at least one of said heating elements is axially adjustable.

15. The rotary conveyor of claim 1 further comprising a plurality of resin application nozzles located above work pieces received in said work piece support members for applying resin to said work pieces as said work pieces are transported about said conveyor.

16. The rotary conveyor of claim 4 wherein said work piece support members are mounted in a cylindrical frame having a plurality of circumferentially and axially spaced openings formed therein corresponding to said plurality of arrays.

17. The rotary conveyor of claim 16 wherein said cylindrical frame is constructed of an annular array of circumferentially arranged columns.

18. The conveyor of claim 1 further comprising a loading assembly for loading said work pieces in said conveyor, said loading assembly including a radially-oriented loading bar for retaining a plurality of work pieces and a loading gripper located adjacent a radially inner end of said loading bar for gripping said work pieces, lifting said work pieces off said loader bar and placing them in a work piece support member in said conveyor.

19. The rotary conveyor of claim 18 wherein said loading assembly further includes a pusher bar which reciprocates along the length of said loader bar and pushes said work pieces towards the radially inner end of said loader bar.

20. The conveyor of claim 18 further comprising an unloading assembly for unloading said work pieces from said conveyor, said unloading assembly including a radially-oriented unloading bar for retaining a plurality of work pieces and an unloading gripper assembly for gripping said work pieces, removing said work pieces from an associated work piece support members and placing them on said unloading bar.

21. The rotary conveyor of claim 5 further comprising a transfer assembly for transferring said work pieces from a first array to a second array, said transfer assembly including a transfer gripper for gripping and removing said work piece from a work piece support member on said first array and placing said work piece in a work piece support member on said second array.

22. The rotary conveyor of claim 21 wherein said transfer gripper is mounted in bearings such that when said transfer gripper grips said work piece in said work piece support member said transfer gripper rotates along with said work piece.

23. The rotary conveyor of claim 22 wherein said transfer assembly further includes a transfer motor coupled to said transfer gripper such that if the rotational motion of said transfer gripper drops below a predetermined level said transfer motor drives said transfer gripper at a minimum rotational rate.

24. The rotary conveyor of claim 16 wherein said cylindrical frame is mounted on the outer race of a turret bearing.

25. The rotary conveyor of claim 1 wherein each work piece support member includes a split bushing for receiving a shaft of said work pieces, said split bushing comprising opposing halves of a bushing forming an inner hole having a diameter smaller than the diameter of said shaft, each said half being spring biased radially inwardly to retain said shaft in said bushing.

26. The rotary conveyor of claim 1 further comprising a resistance heating element for contacting and heating said work pieces.

27. The rotary conveyor of claim 1 wherein said conveyor includes a support platform, said work piece support members being circumferentially arranged about said support platform to thereby form said array.

28. The rotary conveyer of claim 10 further comprising an outer housing encompassing said array and said indexer, said housing having a plurality of access doors formed therein.

29. The rotary conveyor of claim 1 further comprising a turret bearing having an inner race and an outer race and said array is supported on said outer race and said drive ring is supported on said inner race.

30. A rotary oven comprising:

a plurality of annular arrays of a plurality of circumferentially spaced work piece support members for receiving a work pieces, said arrays being spaced from one another on a common axis;

a plurality of drive rings, each of said drive rings being coaxially associated with one of said arrays, said drive rings being mounted radially inwardly of said arrays; said drive rings being rotatable independently of said arrays such that said drive rings move rotationally with respect to said arrays;

said work piece support members including a means for rotating said member which interfaces with a drive ring and transmits power from said drive ring to said member for rotating a work piece supported in said member;

at least one heating element positioned at the periphery of at least one of said arrays such that said heating element heats work pieces retained in said work piece support members, said heating element being mounted within a heating chamber, said heating chamber being outwardly pivotable;

means for rotating said annular arrays; and means for rotating said drive rings.

31. A transfer assembly for transferring rotating work pieces from a first array to a second array while maintaining the rotation of said work pieces, said transfer assembly including a transfer gripper for gripping and removing said work piece from a work piece support member on said first array and placing said work piece in a work piece support member on said second array, said transfer assembly further including a transfer motor coupled to said transfer gripper such that if the rotational motion of said transfer gripper drops below a predetermined level said transfer motor drives said transfer gripper to maintain rotation.

32. The rotary conveyer of claim 1 wherein said relative rotation between said first drive ring and said array causes each work piece to rotate about its central axis, and wherein said means for rotating said array causes said array to rotate around an axis of said array.

33. A rotary conveyer comprising:

an annular array of a plurality of circumferentially spaced work piece support member, each work piece support member being shaped to receive a workpiece;

a rotatable drive ring that engages said work piece support members, wherein when said rotatable drive ring is rotated about its central axis each work piece received in a support members is correspondingly rotated about an axis of said work piece support members; and a motor for rotating said array about a central axis of said array.

34. The rotary conveyer of claim 33 wherein said motor is an indexer.

* * * * *

UNITED STATES PATENT AND TRADEMARK OFFICE

CERTIFICATE OF CORRECTION

PATENT NO. : 5,990,450

DATED : November 23, 1999

INVENTOR(S) : Eric John Kirker et al.

It is certified that error appears in the above-identified patent and that said Letters Patent is hereby corrected as shown below:

Claim 9, col. 13, line 19, the term "moves" should be --rotates--.

Signed and Sealed this

Tenth Day of October, 2000

Attest:

Q. TODD DICKINSON

Attesting Officer

*Director of Patents and Trademarks*